(12) United States Patent
Kim

(10) Patent No.: US 10,439,468 B2
(45) Date of Patent: Oct. 8, 2019

(54) MOTOR INCLUDING BEARING SEATING UNIT

(71) Applicant: LG Innotek Co., Ltd., Seoul (KR)

(72) Inventor: Yong Joo Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 201 days.

(21) Appl. No.: 15/174,165

(22) Filed: Jun. 6, 2016

(65) Prior Publication Data

US 2016/0359389 A1 Dec. 8, 2016

(30) Foreign Application Priority Data

Jun. 4, 2015 (KR) .................. 10-2015-0079186

(51) Int. Cl.
*H02K 5/24* (2006.01)
*H02K 11/21* (2016.01)
(Continued)

(52) U.S. Cl.
CPC ............ *H02K 5/24* (2013.01); *F16C 19/527* (2013.01); *F16C 35/045* (2013.01);
(Continued)

(58) Field of Classification Search
CPC . H02K 11/00; H02K 5/16; H02K 1/14; H02K 1/2706; H02K 5/24; H02K 5/1737;
(Continued)

(56) References Cited

U.S. PATENT DOCUMENTS 6,265,804 B1* 7/2001 Nitta ............... H02K 1/148
310/193
8,288,905 B2* 10/2012 Qin ............... H02K 5/1732
310/239

(Continued)

FOREIGN PATENT DOCUMENTS

CN 101358599 A 2/2009
CN 104518601 A 4/2015
(Continued)

OTHER PUBLICATIONS

Extended European Search Report dated Oct. 14, 2016 in European Application No. 16164857.1.
(Continued)

*Primary Examiner* — John K Kim
(74) *Attorney, Agent, or Firm* — Saliwanchik, Lloyd & Eisenschenk

(57) ABSTRACT

The present invention relates to a motor including a motor housing, a stator installed in the motor housing and including a stator core including a plurality of unit stator cores having teeth protruding from a head unit, an insulator, and a coil, a rotor rotatably installed at a center of the stator and including a through hole formed at a center thereof and a magnet module, and a bracket disposed at an upper portion of the motor housing and including a bearing supporting a rotating shaft and a bearing seating unit, wherein the bearing seating unit includes a lateral supporting part supporting a side surface of the bearing and a lower supporting part perpendicularly protruding from the lateral supporting part (Continued)

so that the bearing is seated, and noise reducing groove units are provided on a surface of the lower supporting part.

5 Claims, 4 Drawing Sheets

(51) Int. Cl.
| | |
|---|---|
| *H02K 1/27* | (2006.01) |
| *H02K 7/08* | (2006.01) |
| *F16C 35/067* | (2006.01) |
| *F16C 19/52* | (2006.01) |
| *H02K 5/173* | (2006.01) |
| *H02K 11/215* | (2016.01) |
| *H02K 1/14* | (2006.01) |
| *F16C 35/04* | (2006.01) |
| *F16C 19/06* | (2006.01) |

(52) U.S. Cl.
CPC ............. *F16C 35/067* (2013.01); *H02K 1/14* (2013.01); *H02K 1/2706* (2013.01); *H02K 5/1737* (2013.01); *H02K 7/08* (2013.01); *H02K 11/215* (2016.01); *F16C 19/06* (2013.01)

(58) Field of Classification Search
CPC ....... H02K 7/08; H02K 11/215; F16C 19/527; F16C 25/08; F16C 35/067
USPC ........ 310/68 B, 89, 91, 90, 216.008; 29/596, 29/598
See application file for complete search history.

(56) References Cited

U.S. PATENT DOCUMENTS

| | | | | |
|---|---|---|---|---|
| 2008/0211357 A1* | 9/2008 | Kataoka | ............... | H02K 11/215 310/68 B |
| 2009/0195127 A1* | 8/2009 | Lin | ........................ | H02K 1/146 310/75 C |
| 2010/0127587 A1* | 5/2010 | Qin | ........................ | H02K 5/148 310/89 |
| 2011/0254395 A1* | 10/2011 | Friedl | ................. | F16C 33/6607 310/90 |
| 2013/0026888 A1* | 1/2013 | Migita | ................... | H02K 29/08 310/68 B |
| 2013/0199249 A1* | 8/2013 | In | ........................... | H02K 1/165 68/140 |
| 2015/0084461 A1* | 3/2015 | Furukawa | .............. | H02K 5/161 310/90 |
| 2015/0311766 A1* | 10/2015 | Matsuda | ................ | H02K 29/08 417/423.7 |
| 2015/0333576 A1* | 11/2015 | Inuzuka | ................ | H02K 1/148 310/216.055 |
| 2016/0164350 A1* | 6/2016 | Matsunaga | ............ | H02K 1/148 310/216.009 |
| 2016/0359389 A1* | 12/2016 | Kim | ..................... | H02K 11/215 |

FOREIGN PATENT DOCUMENTS

| | | |
|---|---|---|
| EP | 1710894 A1 | 10/2006 |
| JP | 0164958 U1 | 4/1989 |
| KR | 20-1992-0018156 U | 10/1992 |
| KR | 1992-0018156 U | 10/1992 |
| KR | 20-2003-0037991 U | 3/2004 |
| KR | 20-0344008 Y1 | 3/2004 |
| KR | 20-0405246 Y1 | 1/2006 |
| KR | 2004-05246 Y1 | 1/2006 |

OTHER PUBLICATIONS

Office Action dated Apr. 24, 2019 in Chinese Application No. 201610262244.6.

* cited by examiner

MOTOR INCLUDING BEARING SEATING UNIT

CROSS-REFERENCE TO RELATED APPLICATION

This application claims the benefit under 35 U.S.C. § 119 of Korean Patent Application No. 10-2015-0079186, filed Jun. 4, 2015, which is hereby incorporated by reference in its entirety.

BACKGROUND

1. Field of the Invention

The present invention relates to a motor capable of reducing a noise.

2. Discussion of Related Art

A motor is a device generating a driving force by interaction between a stator and a rotor. The motor is classified into an adjustable voltage motor in a direct current system and a three-phase induction motor in an alternating current system. For example, the motor is used for a traction motor applying traction to equipment, such as an elevator or a vehicle, and is further used for an electronic power steering (EPS) system for ensuring steering safety of a vehicle.

The EPS of them enables a driver to safely drive a vehicle, since an electronic control unit operates the motor according to an operation condition detected in a vehicle speed sensor, a torque angle sensor, a torque sensor etc. to ensure rotation safety and provide a quick restoring force. The EPS system enables a driver to steer a vehicle with less power since the motor assists in generating toque operating a steering wheel for steering.

Particularly, a bearing supporting a rotating shaft is provided in the motor, and the bearing is arranged to be seated on a bracket. When a foreign material is between the bearing and a seating unit or a surface is inclined due to a foreign material or a manufacturing tolerance on a surface of the bearing seating unit, the bearing is inclined to cause an alignment defect of the rotating shaft and dislocation of the bearing, and thus a severe noise is generated during rotation.

SUMMARY OF THE INVENTION

The present invention is directed to a motor capable of preventing a noise generated due to an alignment defect of a bearing seating unit by having a groove pattern accommodating a foreign material on a surface of the seating unit provided in the bracket on which a bearing is seated so that the foreign material is naturally moved to the groove pattern even if a fine foreign material is inserted into the bearing seating unit.

According to an aspect of the present invention, there is provided a motor including a motor housing, a stator installed in the motor housing and including a stator core including a plurality of unit stator cores having teeth protruding from a head unit, an insulator, and a coil, a rotor rotatably installed at a center of the stator and including a through hole formed at a center thereof and a magnet module, and a bracket disposed at an upper portion of the motor housing and including a bearing supporting a rotating shaft and a bearing seating unit, wherein the bearing seating unit includes a lateral supporting part supporting a side surface of the bearing and a lower supporting part perpendicularly protruding from the lateral supporting part so that the bearing is seated, and noise reducing groove units are provided on a surface of the lower supporting part.

According to the embodiments of the present invention, the motor can prevent a noise generated due to an alignment defect of a bearing seating unit by having a groove pattern accommodating a foreign material on a surface of the seating unit provided in the bracket on which a bearing is seated so that the foreign material is naturally moved to the groove pattern even if a fine foreign material is inserted into the bearing seating unit.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
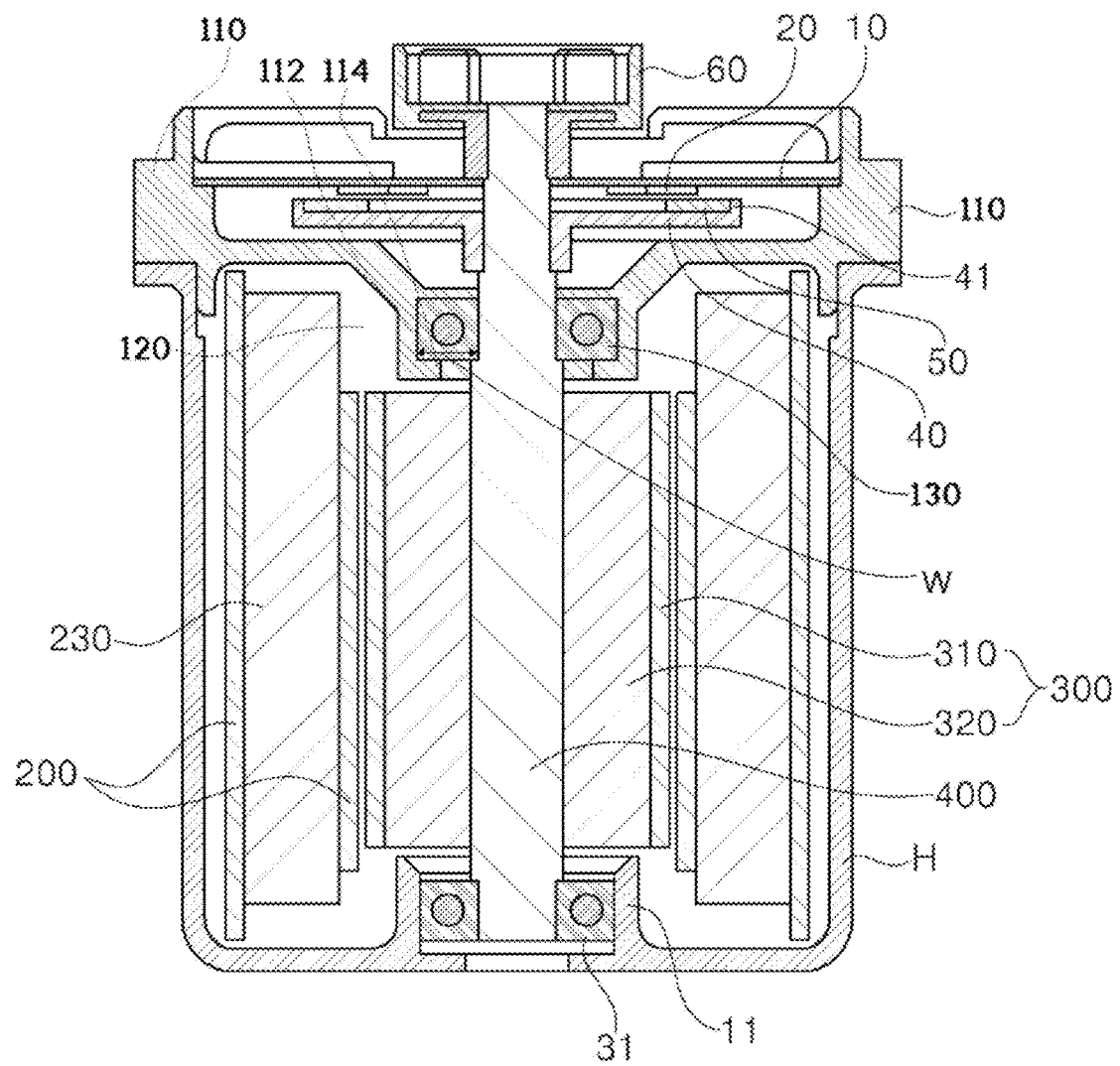
FIG. 1 is a conceptual view of a cross-section illustrating a whole structure of a motor according one embodiment of the present invention.

Hereinafter, configurations and operations according to the present invention will be described in detail with reference to the accompanying drawings. In the description with reference to the accompanying drawings, like elements are designated by the same reference numerals regardless of drawing numbers, and duplicated descriptions thereof will be omitted. Although the terms "first," "second," etc. may be used herein to describe various elements, these elements should not be limited by these terms. These terms are only used to distinguish one element from another.

Figure 2:
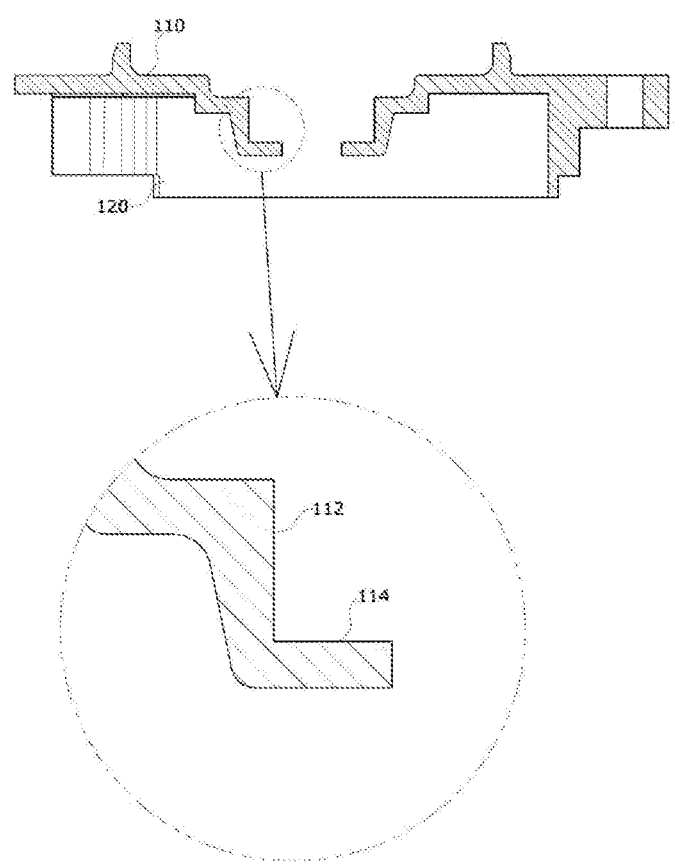
FIGS. 2 and 3 are conceptual views of a concave portion for illustrating the shape of a bearing seating unit according to one embodiment of the present invention.
Figure 3:
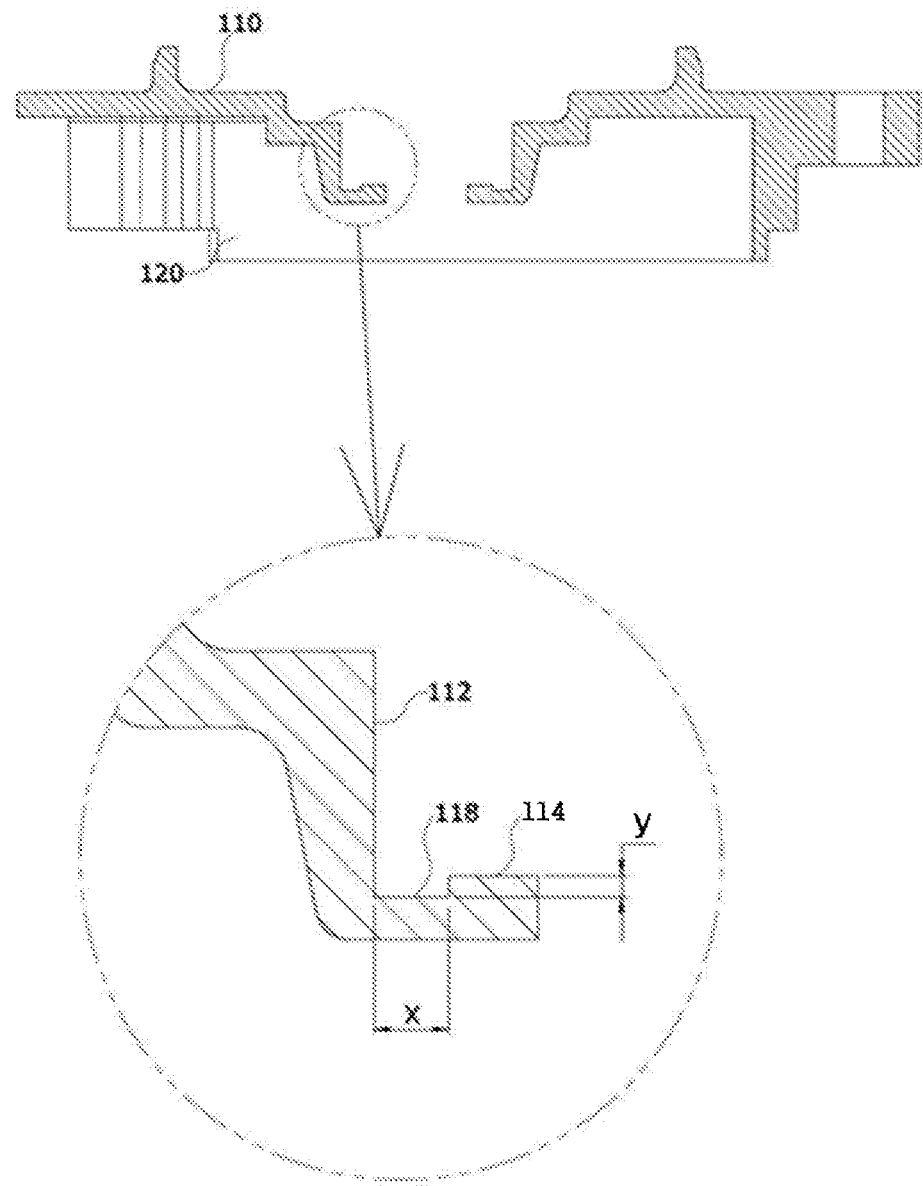
Figure 4:
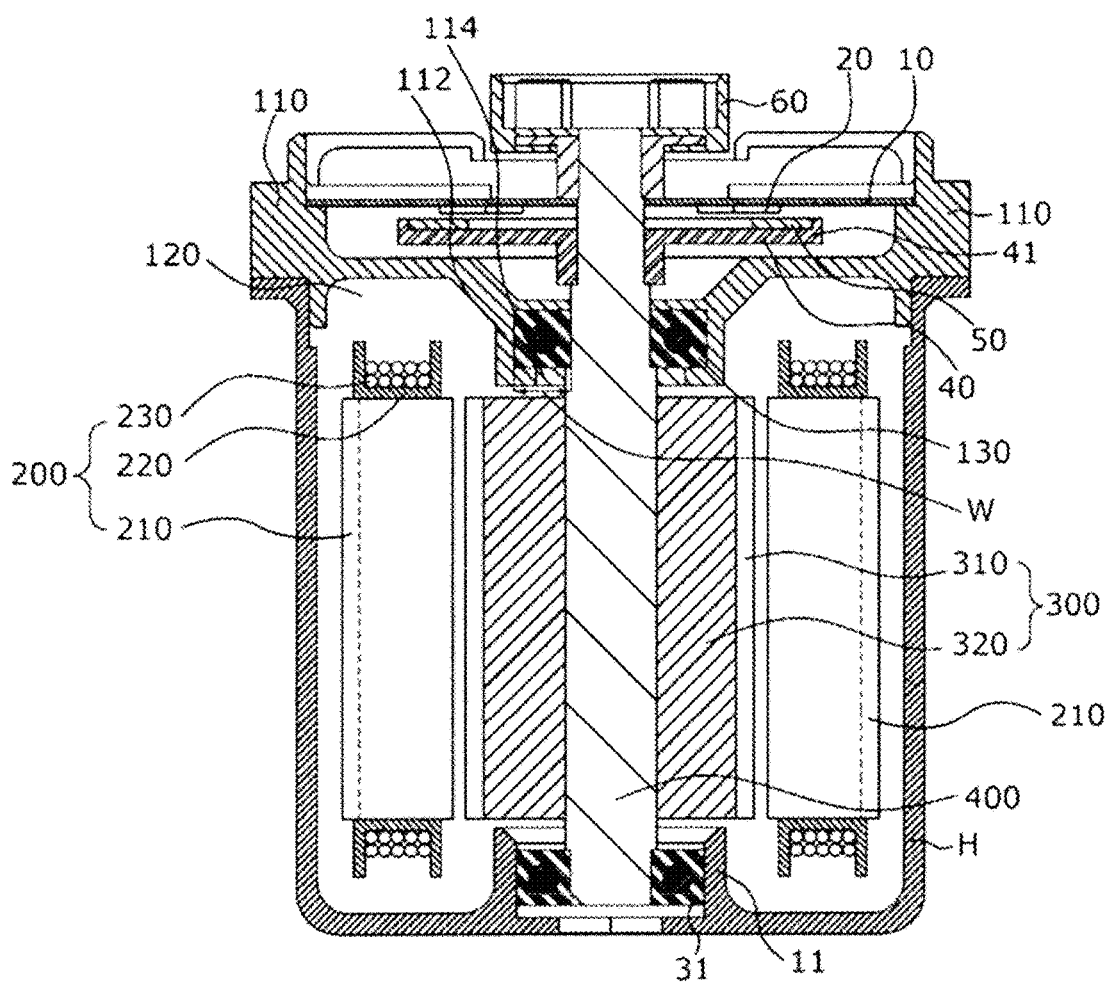
FIG. 4 is a conceptual view of a cross-section illustrating a stator core including a plurality of unit stator cores having teeth protruding from a head unit, an insulator, and a coil according one embodiment of the present invention.

FIG. 1 is a conceptual view of a cross-section illustrating a whole structure of a motor according one embodiment of the present invention. FIGS. 2 and 3 are conceptual views of a concave portion for illustrating the shape of a bearing seating unit according to one embodiment of the present invention.

Referring to FIGS. 1-4, a motor according to the embodiment of the present invention includes: a motor housing H; a stator installed in the motor housing H and including a stator core 200, which includes a plurality of unit stator cores having teeth protruding from a head unit 210, an insulator 220, and a coil; a rotor 300 rotatably installed at a center of the stator and including a through hole formed at a center thereof and a magnet module; and a bracket 110 disposed at an upper portion of the motor housing and including a bearing 130, which supports a rotating shaft, and bearing seating units 112 and 114.

Particularly, in the embodiment of the present invention, the bearing seating units 112 and 114 include a lateral supporting part 112 supporting a side surface of the bearing and a lower supporting part 114 perpendicularly protruding from the lateral supporting part so that the bearing is seated thereon. Noise reducing groove units 118 of FIG. 3 may be provided on a surface of the lower supporting part.

The noise reducing groove unit has a groove pattern accommodating a foreign material on a surface of the bearing seating unit to induce a fine foreign material to naturally move into the groove unit even if the fine foreign material is inserted into the bearing seating unit, thereby preventing a noise generated due to an alignment defect of the bearing seating unit.

Specifically, features of the embodiment of the present invention described above will be described with reference to FIGS. 2 and 3.

FIG. 2 is a conceptual view enlarging and specifying a configuration of the bracket 110 shown in FIG. 1. The bracket is generally seated on a supporting block 120, and the bearing seating units 112 and 114 are provided at an inner end of the bracket bent so that the bearing is seated thereon.

The shapes of the bearing seating units 112 and 114 generally have a bent structure having a space in which the bearing is seated. In this case, the lower supporting part 114 of the bearing seating unit on which the bearing is seated to be attached is formed to be flat. However, due to tolerance at the time of manufacturing, it is easy for the lower supporting part 114 of the bearing seating unit to be manufactured so as to be partially inclined. Although a flat structure is implemented, a foreign material generated outside or inside is easily placed due to rotation of the motor, a problem in which the mounted bearing is inclined occurs. Therefore, a loud noise is generated due to friction between the bearing and a surface of the seating unit.

Thus, in the embodiment of the present invention, as shown in FIG. 3, the noise reducing groove units 118 are provided in the bearing seating unit provided in the bracket 110. Specifically, the bearing seating unit according to the embodiment of the present invention includes the lateral supporting part 112 supporting a side surface of the bearing and the lower supporting part 114 perpendicularly protruding from the lateral supporting part 112 so that the bearing is mounted thereon, and particularly, the noise reducing groove units 118 may be formed on a surface of the lower supporting part. The noise reducing groove unit 118 has a concave groove pattern on the surface of the lower supporting part 114, as shown in FIG. 3, and may be disposed to be adjacent to a boundary line between the lateral supporting part 112 and the lower supporting part 114. Of course, it is favorable in gathering the foreign materials, scattered on the surface by rotation, toward the groove unit. However, the arrangement structure is one of the embodiment of the present invention, and the noise reducing groove units 118 may be formed at a center area or an end area of the lower supporting part 114 in a structure of one or more groove patterns.

Describing the shape of the noise reducing groove unit 118 based on the structure shown in FIG. 3, the ratio of a width of the bearing W to be mounted later on to a width of the noise reducing groove unit 118 may be 1:0.02 to 0.08. So to speak, when the width of the bearing W is 10 mm and a height thereof is 7 mm, the width x of the noise reducing groove unit 118 may be in a range of 0.2 to 0.8 mm.

Further, the ratio of the height of the bearing to a depth of the noise reducing groove unit 118 may be 1:0.015 to 0.055. For example, when the width of the bearing is 10 mm and the height thereof is 7 mm, the depth y of the noise reducing groove unit 118 may be in a range of 0.105 to 0.385 mm.

That is, the width and the depth of the noise reducing groove unit 118 may be appropriately adjusted according to the bearing to be arranged. Particularly, it is preferable that the width x be 0.02 to 0.08 of the width of the bearing and the depth y be 0.015 to 0.055 of the height of the bearing. When the width and depth are out of the range, it is difficult to efficiently deal with the introduction of the foreign material when they are less than the range, and thus the effect of reducing a noise is minor. The bearing cannot adjust the slight movement by itself when the width and the depth are greater than the range, and thus the noise may be increased.

Further, considering the whole lower supporting part 114, the noise reducing groove unit 118 may have a width equal to or less than a half of the width of the lower supporting part 114, and the width of the noise reducing groove unit 118 is less than a width of an area in which the noise reducing groove unit 118 is not provided, thereby preferably ensuring safety when the bearing is seated.

Hereinafter, operations of other configuration of the motor having the bracket 110 having the bearing seating unit in FIG. 3 will be described with reference to FIG. 1.

The motor having the bearing seating unit according to the embodiment of the present invention will be described with an electric power steering (EPS) motor as an example. But the motor to which the bracket according to the embodiment is applied may be applied to various motors such as a traction motor applying traction to equipment such as an elevator or vehicle.

Referring to FIG. 1, the motor according to the embodiment of the present invention includes a motor housing H and a bracket 110 coupled to the motor housing H in the same structure as in FIG. 3. The motor housing H has an open upper surface and a lower surface having a supporting tube 11 protruding therefrom. The bracket 110 is coupled to an upper portion of the motor housing H to form a space inside thereof. A first bearing 31 is installed in the supporting tube 11, and a second bearing 130 is installed in the bracket 110. A rotating shaft 400, a shaft, is in contact with the first bearing 31 and the second bearing 130 to be supported. An upper portion of the rotating shaft 400 is supported by the second bearing 130, and a lower portion of the rotating shaft 400 is supported by the first bearing 31.

An upper end portion of the rotating shaft 400 protrudes upward to pass through the bracket 110 and is coupled to a tool 60 connected with a steering wheel (not shown). A stator and a rotor are installed in the motor housing H. The rotor includes a rotor core 320 coupled to the rotating shaft 400 and a magnet 310 coupled to an outer circumferential surface of the rotor core 320. In the embodiment of the present invention, a structure in which the magnet is coupled to the outer circumferential surface of the rotor core was described as an example, but unlike this, a structure in which the magnet is inserted into the rotor core may be applied. The stator includes a stator core 200 disposed between the magnet 310 and the motor housing H and a coil 230 wound around the stator core 200.

In the above-described structure, the rotating shaft 400 is rotated by interaction between the magnetic field generated in the stator and the electric field generated in the rotor.

Meanwhile, a sensing plate 190 is coupled to the rotating shaft 400 to rotate along with the rotating shaft 400, and a sensing magnet 50 is installed at the sensing plate 190. A circuit board 10 is installed in the bracket 110, and a sensing element 20 facing the sensing magnet 50 may be installed in the circuit board 10. The sensing element 20 detects the degree of rotation of the sensing magnet 50 to detect the degrees of rotation of the rotating shaft 400 and the sensing plate 190 coupled with the sensing magnet 50.

The detailed description of the present invention as described above has been described with reference to certain preferred embodiments thereof. However, various modifications may be made in the embodiments without departing from the scope of the present invention. The inventive concept of the present invention is not limited to the embodiments described above, but should be defined by the scope of claims and equivalents thereof.

DESCRIPTION OF SYMBOLS

110: BRACKET
112: LATERAL SUPPORTING PART
114: LOWER SUPPORTING PART
118: NOISE REDUCING GROOVE UNIT

What is claimed is:

1. A motor comprising:
a motor housing;
a stator installed in the motor housing and including a stator core including a plurality of unit stator cores and a coil;
a rotor rotatably installed at a center of the stator and including a through hole formed at a center thereof and a magnet module; and
a bracket disposed at an upper portion of the motor housing and including a bearing supporting a rotating shaft and a bearing seating unit,
wherein the bearing seating unit includes a lateral supporting part configured to support a side surface of the bearing and a lower supporting part perpendicularly protruding from the lateral supporting part so that the bearing is seated,
wherein a noise reducing groove unit is provided on a surface of the lower supporting part,
wherein a ratio of a width of the bearing to a width of the noise reducing groove unit is 1:0.02 to 0.08; and
wherein a ratio of a height of the bearing to a depth of the noise reducing groove unit is 1:0.015 to 0.055.

2. The motor of claim 1, wherein the noise reducing groove unit is disposed to be adjacent to a boundary line between the lateral supporting part and the lower supporting part.

3. The motor of claim 1, wherein the at least two noise reducing groove units are provided on the surface of the lower supporting part.

4. The motor of claim 2, wherein the bearing seating unit is formed so that a width of a portion of the surface of the lower supporting part on which the noise reducing groove unit is disposed is smaller than a width of a portion of a surface of the lower supporting part on which the noise reducing groove is absent.

5. A motor comprising:
a motor housing;
a stator installed in the motor housing and including a stator core including a plurality of unit stator cores having teeth protruding from a head unit, an insulator, and a coil;
a rotor rotatably installed at a center of the stator and including a through hole formed at a center thereof and a magnet module; and
a bracket disposed at an upper portion of the motor housing and including a bearing supporting a rotating shaft and a bearing seating unit,
wherein the bearing seating unit includes a lateral supporting part configured to support a side surface of the bearing and a lower supporting part perpendicularly protruding from the lateral supporting part so that the bearing is seated,
wherein a noise reducing groove unit is provided on a surface of the lower supporting part,
wherein a ratio of the width of the noise reducing groove unit to the depth thereof is 5:2.

* * * * *